ERASING MEANS FOR MAGNETIC RECORDERS

Filed Dec. 3, 1949 2 SHEETS—SHEET 1

INVENTOR
ROBERT M. CAIN
BY
Ostrolenk & Faber
ATTORNEYS

April 14, 1953 R. M. CAIN 2,635,149

ERASING MEANS FOR MAGNETIC RECORDERS

Filed Dec. 3, 1949 2 SHEETS—SHEET 2

INVENTOR
ROBERT M. CAIN
BY
Ostrolenk & Faber
ATTORNEYS

Patented Apr. 14, 1953

2,635,149

UNITED STATES PATENT OFFICE 2,635,149

ERASING MEANS FOR MAGNETIC RECORDERS

Robert M. Cain, Charlotte, Mich., assignor to Wilcox-Gay Corporation, Charlotte, Mich., a corporation of Michigan Application December 3, 1949, Serial No. 132,841

7 Claims. (Cl. 179—100.2)

My present invention relates to sound apparatus and more particularly to a novel magnetic erasing system for magnetic recording tapes. My invention also contemplates a novel arrangement of the erasing and recording magnet to reduce or obviate the noise level of a recording.

One primary difference between a piece of magnetic tape which has recorded intelligence thereon and one which has never had any recording on it lies in the fact that the magnetic particles are in the recorded version aligned in some intelligent pattern, whereas in the virgin tape they are of a randomized nature. A recorded tape is one in which the particles have been passed across a recording head or device to which has been impressed the suitable recording voltages which result in the modulation, magnetically speaking, of the particles within the tape coating. Much has been written concerning physical properties of magnets but little is known; for the purpose of this disclosure, we shall assume that ferrous metals are made up of particles or domains which are normally in their own right magnetic with definite polarities but arranged in a randomized form so that the total mass of matter has no polarity. The process of magnetizing this matter is one of realigning the particles or domains so that they in general lie parallel with one another resulting in the polarizing of the matter itself. It must be understood that the particles here referred to are magnetic domains or discrete fields of magnetic force and not necessarily molecular or tangible particles.

Thus, when the recording head is brought into contact with the magnetic tape and a suitable magnetizing modulation is impressed on the head, the result is to align the particles within the coating of the tape to conform with the direction of the lines of force which occur at the point of contact between the tape and the recording head. During playback, this same tape, when passed across the same portion of the recording head will, by virtue of these aligned particles, induce a voltage into the recording or playback head, thus reproducing the modulation.

It can now be seen that the optimum conditions prevail when the particles, which are intended to convey intelligence by reason of their patterned alignment, are all in their proper position so that this voltage induction may occur. However, any particles, which although they may be aligned in somewhat the same direction as these former particles but do not have the proper patterned alignment will result in a voltage induction which has no basis for intelligence. This we shall call noise. When recording using virgin tape (one with no previous magnetic history), the individual particles are so completely randomized that the statistical possibilities of these particles being in an alignment which would result in noise are of the lowest.

However, the proper use of magnetic tape would imply that its reuse should be possible and thus it is necessary to erase a previous modulation and to leave the particles in such a condition that the lowest noise level will be achieved. Formerly this has been done in two basically different manners. One is the A. C. erase which is a process of passing the tape past a device which induces an A. C. field and the particles when leaving this field are supposedly completely randomized. The other method is by means of an array of permanent magnets which, through their polarization and their distance with respect to the tape, result in the particles passing through a very modest form of A. C. field. In other words, the particles pass through perhaps one and a half to three cycles, each half cycle diminishing its strength. This latter method, although it effectively removes all previous modulation, does not result in as quiet a tape or, in other words, as low a noise level as can be obtained by the A. C. completely randomized method. The reason for this is that the particles are apparently not all the same mass and their ability to statistically rearrange themselves in their random fashion are very low in that the relatively few reversals cannot act uniformly on all the particles.

Inasmuch as the problem of erasing and leaving as low a noise level as possible is not one of necessarily randomizing the particles but rather to rearrange them for minimum voltage induction, it would seem that if these particles could be completely oriented in such a way that none of them could induce a voltage into the head that the noise would be at least as low as the completely randomized version of erasure.

Assuming that there is an alignment of particles with respect to the orientation of the recording head which gives the maximum voltage induction, it is obvious that minimum voltage induction would be obtained if these particles were aligned in a transverse fashion to this previous maximum alignment. With this new alignment, each south pole and its associated north pole passes a given line in space simultaneously (this line being the gap in the recording and playback head); consequently the minute domain of magnetized particles thus aligned can produce no E. M. F. in the playback head. Thus, assuming that the gap in the recording and playback head is transverse of the tape at 90° to the edges of the tape providing the opportunity for maximum modulation, the optimum erasing method pursuant to my novel system would be the application of external magnetic force to the tape intended to align the domains, particles or other magnetizable discrete elements of the tape so that a line connecting each south pole with its associated north pole would extend transversely of the tape at 90° to the edge thereof, and parallel to the gap in the recording and playback head. This would produce an alignment of these particles which would be incapable of inducing any effective E. M. F. in the head when it is used as a playback head.

An object of my invention therefore is the arrangement of the gap of an erasing magnet in a direction substantially normal to that of a recording magnet.

Another object of my invention is the erasure of a magnetic tape by aligning the particles therein substantially parallel to the gap of the recording and play back magnet or magnets in non-inductive relation therewith.

Another and important object of my invention is inclining the gap of an erasing magnet to the path of movement of the tape so that a narrow gap may be provided extending nevertheless over the width of the tape, thereby providing a concentrated magnetic field over the whole width of the tape.

The foregoing and many other objects of my invention will become apparent in the following description and drawings in which.

Figure 6:
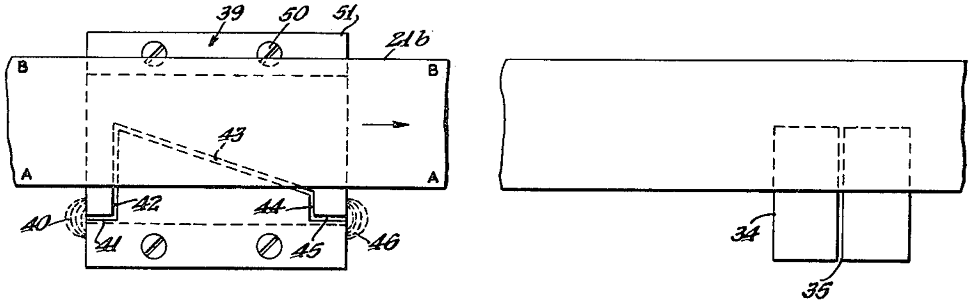
Figure 6 is a schematic view of my novel erasing magnet modified to avoid fringe effects where only a longitudinal half of a tape is to be erased.
Figure 7:
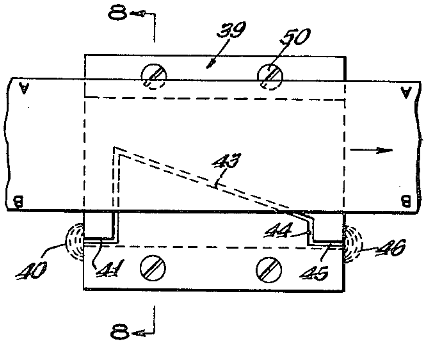

Figure 7 corresponds to Figure 6 showing the tape turned over for erasing of the other half.

Figure 8:
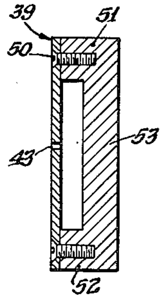

Figure 8 is a cross-sectional view taken on line 8—8 of Figure 7 showing the construction of the erasing magnet.

Alignment of magnetic particles or domains is accomplished when they are introduced into a magnetic field which is strong enough to overcome their inherent coerciveness, that is, their tendency to remain in any fixed formation. This is not to be confused with inertia although inertia may have some part to play but the inter-attraction between particles is basically responsible for their desire to remain in any fixed position. This tendency must be overcome with an external field in order that their formation can be changed.

Figure 1:
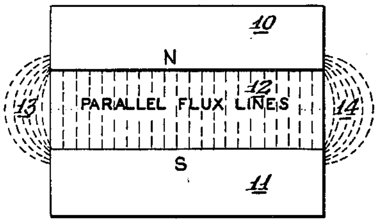
Figure 1 is a schematic view of one form of prior erasing magnet.

Referring now to Figure 1, the magnetic structure of an erasing magnet of a generic type is shown consisting of two pole faces 10, 11, and the figure shows the manner in which the flux lines 12 exist between the pole faces. The lines run substantially parallel except where the pole faces terminate and at these areas 13, 14, the lines diverge into what is known as fringe flux and these lines form in ever-enlarging circles and are not parallel to the main flux group. If a portion of magnetic tape were passed through the magnetic flux from left to right, the individual particles or domains would first pass through a fringe flux area 13 consisting of curved lines and would arrange themselves to conform to those lines providing the fringe flux were strong enough. The particles or domains would then progress into the region of parallel flux lines 12 and again would rearrange themselves and continuing through the path, the last magnetic influence which these particles would have would be a curved or fringe flux area 14. Assuming that the parallel flux lines 12 were arranged to be parallel to the gap in the magnetic recording and playback head, the erasing magnet shown in Figure 1 would completely erase the modulation from the tape and if it were physically possible to remove the tape from between the pole faces so that the last magnetic influence were the parallel flux lines, the result would be to have a low noise erasure but since the last magnetic history was the influence of the curved magnetic field or fringe flux 14, the particles are not aligned in their low noise desired arrangement but are left at a variety of angles depending on the strength and extent as well as the direction of the fringe flux at the point of exit of the tape from the magnetic field.

Figure 3:
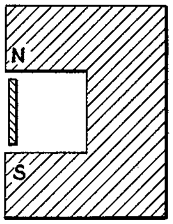
Figure 3 is a cross-sectional view on line 3—3 of Figure 1.
Figure 2:
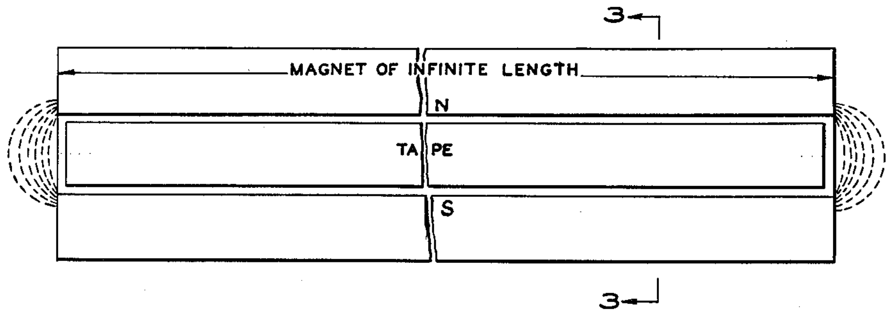
Figure 2 is a schematic view of an ideal erasing magnet of infinite length.

A magnet of infinite length as indicated in Figures 2 and 3 would avoid the fringe flux problem but cannot be obtained.

One method of obtaining an erasure as indicated in Figures 2 and 3 would be to put the entire reel of tape between large massive pole faces, turning on a D. C. magnetizing force for an instant and then shutting it off. Thus, the tape would be entirely contained within the straight parallel flux field and would not be removed physically but the current itself would be shut off. Thus, no fringe flux would be obtained. The result of this would be to align all particles in the proper manner which we are trying to do. However, to be perfectly practical, the required machine for magnetizing the area of a complete reel of tape with a pole face gap of approximately one half inch (reel thickness) would be very undesirable for living room use. For a small erase magnet to have a strong enough flux for the entire width of the tape is almost impossible.

Figure 4:
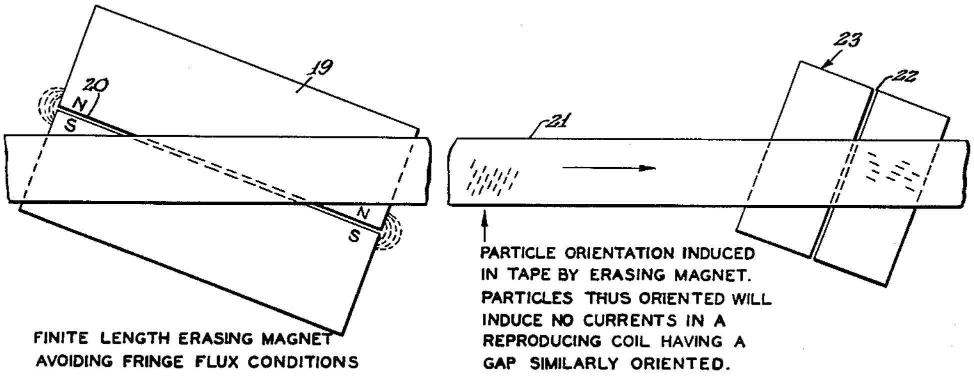
Figure 4 is a schematic view of one form of erasing magnet and reproducing magnet in accordance with my invention.

The basic principle of my invention is shown in Figure 4 where erase magnet 19 has an inclined narrow gap 20 between the pole faces. Although this inclination is used to get away from the fringing at the end of the pole faces, one of its most important functions is to make it possible to use a narrow gap between the pole faces, hence high magnetic concentration, and still physically cover the width of the recorded track.

Therefore, by inclining the gap 20, a highly concentrated magnetic erasing field is obtainable by making the gap as small as possible and the deleterious effect of fringe flexes are escaped by running the gap beyond the margins of the tape 21. Figure 4 shows the gap 22 in the recording or playback magnet 23 aligned so that the gap is parallel to the particles after they have left the concentrated field of the erase head.

This gives the minimum induced noise since the erased particles are aligned in a direction parallel to the gap 22 and can induce no current therein.

In practice, the gap in the recording and playback magnet is arranged transverse of the direction of movement of the tape and the aligned particles are not quite parallel to the gap 22, still the degree of inclination of the gap in the erase head is such that, although the particles are left somewhat inclined with respect to the playback gap 22, this makes no practical difference as far as the noise level is concerned, particularly since the angle of inclination is relatively small and the effect of the inclination follows a sine function so that a relatively small angle of inclination will not make a difference noticeable to the normal ear.

Where two adjoining longitudinal sections of the tape are to be used, the avoidance of fringe flux poses the problem of preventing the extension of the influence of the erasing magnet beyond the axial center of the tape.

Figure 5:
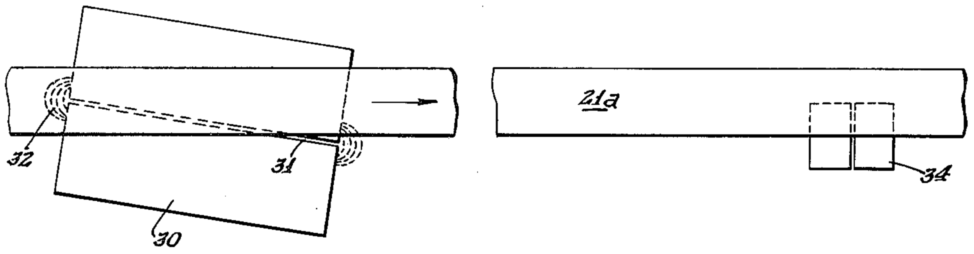
Figure 5 is a schematic view illustrating a difficulty encountered when parallel independent recordings are to be individually erased on a single tape.

Figure 5 shows an erase magnet or erase head 30 placed with respect to the tape so that the gap 31 terminates approximately at the midpoint of the tape. The purpose of this is to erase only half of the tape and a recording head would record a track over only half the tape. The fringe flux 32 at the leading edge of the magnet, that is, the edge which encounters the tape first, is usually strong enough to erase or rearrange particles at quite a distance from the gap. The fringe 32 will now overlap the top half of the tape. Thus this magnetic structure is not practical for two track recording because of fringe flux 32 at the entrance end of the gap.

In order to overcome this difficulty, it was necessary to devise an erasing magnet which does not have a fringe flux which can overlap any portion of the tape which it is desired not to erase.

To do this, my novel erasing structure 39 shown in Figure 6 takes the fringe below the edge of the tape where it can be no harm. Figure 6 shows that the first magnetic flux which the particles in the lower portion of the tape can encounter is the fringe flux 40, at the end of portion 41 of the gap. From there it progresses to a vertical portion 42 of the gap which has very high density horizontal flux. However, these particles must all later pass the slowly inclined portion 43 of the gap which is of equal concentration and they are thus realigned to a slight inclination but substantially vertical. This slowly inclined gap extends below the edge of the tape and by the use of another vertical section 44 and horizontal section 45 in the gap, the fringe flux 46 is carried substantially below the edge of the tape. In this manner all particles in the lower half of the tape pass through a highly concentrated flux which is aligned in a desired direction and the particles do not afterward pass through any deranging flux. The tape then passes the recording head 34, the gap 35 of which is substantially normal to gap 43.

Figure 7 shows the same erase head as in Figure 6 but it will be noted that the tape which is now passing across it has been inverted by turning it end for end. Thus the portion of the tape labeled A, Figure 6, which had been erased and perhaps recorded at the recording head is now passing across a pole face but in a manner which does not bring it in proximity to the high concentrated erasing flux of magnet 39 but portion B of the tape is now going to be erased.

In practice, I have found that I can pierce the pole faces out of sheet material and press the parts immediately back together, which process merely breaks the material but does not separate it. In other words, I can make an erase head that has a gap formed merely by a break in the material, the break conforming to the shape shown in Figures 6 and 7. The jog may be modified somewhat to make more of a dovetail, self-locking device, but the effect of the magnetic flux remains unchanged. At first it would seem that doing away with a physical gap would tend to increase the leakage flux from the pole faces, but exactly the opposite is true. In other words, portion A of the tape in Figure 7 encounters virtually no magnetic strength when passing across the magnetic erase gap if the gap is made as last described.

Careful note should be made that there is a vast difference between alignment or saturation of particles in a preferred direction and the randomizing of particles which has been the normal erase technique until now.

In Figure 8 I have shown my novel magnet 39 having the gap 43, the magnet face 39 being made of sheet metal with the gap 43 cut therein and the face 39 secured by bolts 50 or in any other suitable manner across the poles 51, 52 of a permanent magnet 53 of suitable material.

Heretofore, erasing magnets have attempted to randomize the particles, while my invention is directed to alignment or saturation of all particles in a preferred direction which alignment will have no inductive effect on a reproducing magnet.

In the foregoing I have described my invention solely in connection with illustrative embodiments thereof. Since many variations, modifications and embodiments of my invention may now be obvious to those skilled in the art, I prefer to be bound, not by the specific disclosures herein contained, but only by the appended claims.

I claim:

1. In a magnetic tape recording device having a movable magnetic tape; an erasing magnet having a gap extending at a substantial angle to a line transverse of the tape; said gap creating a magnetic flux substantially transverse to the tape in the plane thereof; each end of the gap extending beyond the same edge of the tape.

2. In a magnetic tape recording device having a movable magnetic tape; an erasing magnet having a gap extending at a substantial angle to a line transverse of the tape; said gap creating a magnetic flux substantially transverse to the tape in the plane thereof; each end of the gap extending beyond the same edge of the tape; the gap having a substantial central portion extending in proximity to at least a portion of the tape.

3. In a magnetic tape recording device having a movable magnetic tape; an erasing magnet having a gap extending at a substantial angle to a line transverse of the tape; said gap creating a magnetic flux substantially transverse to the tape in the plane thereof; each end of the gap extending beyond the same edge of the tape; the gap having a substantial central linear portion extending in proximity to at least a portion of the tape.

4. In a magnetic tape recording device having a movable magnetic tape; an erasing magnet having a gap extending at a substantial angle to a line transverse of the tape; said gap creating a magnetic flux substantially transverse to the tape in the plane thereof; the gap having a substantial central portion extending in proximity to at least a portion of the tape; and a pair of end portions each at a substantial angle to the central portion and extending beyond the edge of the tape.

5. In a magnetic tape recording device having a movable magnetic tape; an erasing magnet having a gap extending at a substantial angle to a line transverse of the tape; said gap creating a magnetic flux substantially transverse to the tape in the plane thereof; the gap having a substantial central portion extending in proximity to at least a portion of the tape; and a pair of end portions each at a substantial angle to the central portion and extending beyond the edge of the tape on the same side of the tape.

6. In a magnetic tape recording device having a movable magnetic tape; an erasing magnet having a gap extending at a substantial angle to a line transverse of the tape; said gap creating a magnetic flux substantially transverse to the tape in the plane thereof; the gap having a substantial central portion extending in proximity to at least a portion of the tape; and a pair of end portions each at a substantial angle to the central portion and extending beyond the edge of the tape on the same side of the tape; each end portion of the gap comprising a section substantially transverse to the tape extending beyond the edge of the tape.

7. In a magnetic tape recording device having a movable magnetic tape; an erasing magnet having a gap extending at a substantial angle to a line transverse of the tape; said gap creating a magnetic flux substantially transverse to the tape in the plane thereof; the gap having a substantial central portion extending in proximity to at least a portion of the tape; and a pair of end portions each at a substantial angle to the central portion and extending beyond the edge of the tape on the same side of the tape; each end portion of the gap comprising a section substantially transverse to the tape extending beyond the edge of the tape; and a section substantially parallel to the axis of the tape extending from said transverse section of the gap substantially parallel to the tape and to the end of the magnet.

ROBERT M. CAIN.

References Cited in the file of this patent

UNITED STATES PATENTS

| Number | Name | Date |
|---|---|---|
| 2,210,770 | Mueller-Ernest | Aug. 6, 1940 |
| 2,419,195 | Begun | Apr. 22, 1947 |
| 2,429,792 | Begun | Oct. 28, 1947 |
| 2,498,423 | Howell | Feb. 21, 1950 |
| 2,543,483 | Barrett | Feb. 27, 1951 |

FOREIGN PATENTS

| Number | Country | Date |
|---|---|---|
| 591,368 | Germany | Jan. 19, 1934 |
| 612,489 | Germany | Apr. 25, 1935 |